United States Patent
Li et al.

(10) Patent No.: US 10,448,376 B2
(45) Date of Patent: Oct. 15, 2019

(54) PUCCH CONFIGURATION METHOD AND APPARATUS

(71) Applicant: Huawei Technologies Co., Ltd., Shenzhen (CN)

(72) Inventors: Bingzhao Li, Beijing (CN); Wei Quan, Beijing (CN); Jinhua Miao, Beijing (CN); Xiaodong Yang, Shenzhen (CN); Zhenxing Hu, Shenzhen (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 15/662,387

(22) Filed: Jul. 28, 2017

(65) Prior Publication Data
US 2017/0325220 A1 Nov. 9, 2017

Related U.S. Application Data

(63) Continuation of application No. PCT/CN2015/071835, filed on Jan. 29, 2015.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0048* (2013.01); *H04W 52/365* (2013.01); *H04W 52/367* (2013.01); *H04W 72/04* (2013.01); *H04W 72/0473* (2013.01); *H04L 1/1812* (2013.01); *H04W 88/02* (2013.01)

(58) Field of Classification Search
CPC .. H04L 1/1812; H04L 5/0048; H04W 52/365; H04W 52/367; H04W 72/04; H04W 72/0413; H04W 72/0473; H04W 88/02
See application file for complete search history.

(56) References Cited

U.S. PATENT DOCUMENTS

2011/0070845 A1* 3/2011 Chen .................. H04L 5/001
455/91
2012/0257552 A1* 10/2012 Chen .................. H04L 5/001
370/280

(Continued)

FOREIGN PATENT DOCUMENTS

CN 103209061 A 7/2013
JP 2013511916 A 4/2013

(Continued)

OTHER PUBLICATIONS

IQ.IP.com patents; May 30, 2019 (Year: 2019).*

(Continued)

*Primary Examiner* — Benjamin H Elliott, IV
(74) *Attorney, Agent, or Firm* — Slater Matsil, LLP

(57) ABSTRACT

Embodiments of the present invention provide a Physical Uplink Control Channel (PUCCH) configuration method and apparatus. A user equipment (UE) receives correspondence indication information sent by a base station. Additionally, the UE determines, according to a currently-used correspondence, a PUCCH used to send uplink feedback information of a second cell.

20 Claims, 3 Drawing Sheets

---

UE receives correspondence indication information sent by a base station, where the correspondence indication information is used to indicate a currently-used correspondence — S101

The UE determines, according to the currently-used correspondence, a PUCCH used to send uplink feedback information of a second cell — S102

(51) Int. Cl.
H04W 52/36 (2009.01)
*H04L 1/18* (2006.01)
*H04W 88/02* (2009.01)

(56) References Cited

U.S. PATENT DOCUMENTS

| | | | | |
|---|---|---|---|---|
| 2013/0188589 A1* | 7/2013 | Nakashima | H04B 7/0404 | 370/329 |
| 2014/0086174 A1* | 3/2014 | Nam | H04L 1/0003 | 370/329 |
| 2014/0233481 A1* | 8/2014 | Feng | H04L 5/0055 | 370/329 |
| 2014/0293893 A1* | 10/2014 | Papasakellariou | H04W 72/04 | 370/329 |
| 2014/0301324 A1* | 10/2014 | Cheng | H04L 1/1861 | 370/329 |
| 2015/0003304 A1* | 1/2015 | Wu | H04L 1/1854 | 370/280 |
| 2015/0016351 A1* | 1/2015 | Lee | H04L 1/1671 | 370/329 |
| 2015/0092713 A1* | 4/2015 | Pelletier | H04W 52/365 | 370/329 |
| 2015/0103811 A1* | 4/2015 | Marinier | H04L 5/001 | 370/336 |
| 2015/0245344 A1* | 8/2015 | You | H04J 11/00 | 370/280 |
| 2015/0264679 A1* | 9/2015 | Uchino | H04W 72/04 | 370/329 |
| 2015/0327230 A1* | 11/2015 | Takeda | H04L 5/001 | 370/329 |
| 2015/0341156 A1* | 11/2015 | Yang | H04W 52/146 | 370/280 |
| 2015/0358997 A1* | 12/2015 | Yang | H04W 72/12 | 370/329 |
| 2016/0073360 A1* | 3/2016 | Uchino | H04W 24/10 | 370/329 |
| 2016/0204905 A1* | 7/2016 | Lee | H04L 1/1812 | 370/329 |
| 2016/0218790 A1* | 7/2016 | Hwang | H04B 17/24 | |
| 2016/0277162 A1* | 9/2016 | Dinan | H04W 48/08 | |
| 2016/0323873 A1* | 11/2016 | Takeda | H04L 5/001 | |
| 2017/0006491 A1* | 1/2017 | Chen | H04B 7/024 | |
| 2017/0257191 A1* | 9/2017 | Seo | H04W 74/002 | |
| 2017/0325220 A1* | 11/2017 | Li | H04W 72/04 | |

FOREIGN PATENT DOCUMENTS

| | | |
|---|---|---|
| JP | 2013516917 A | 5/2013 |
| JP | 2014009396 A | 1/2014 |
| JP | 2014233009 A | 12/2014 |
| WO | 2014054386 A1 | 4/2014 |
| WO | 2014097776 A1 | 6/2014 |
| WO | 2014107052 A1 | 7/2014 |
| WO | 2014123379 A1 | 8/2014 |
| WO | 2015098457 A1 | 7/2015 |

OTHER PUBLICATIONS

IQ.IP.com NPL; May 30, 2019 (Year: 2019).*
3GPP TSG RAN WG2 Meeting #87, R2-143217, "Introduce PUCCH on SCell for CA," Huawei, HiSilicon, Aug. 18-22, 2014, Dresden, Germany, 6 pages.
LG Electronics, "Remaining RAN1 issues on dual connectivity," 3GPP TSG RAN WG1 Meeting #78 ,Dresden, Germany, Aug. 18-Aug. 22, 2014, R1-143174, 6 pages.
3rd Generation Partnership Project; Technical Specification Group Radio Access Network; Evolved Universal Terrestrial Radio Access (E-UTRA); Physical layer procedures (Release 12); 3GPP TS 36.213 V12.4.0, Dec. 2014, 225 pages.
3rd Generation Partnership Project; Technical Specification Group Radio Access Network; Evolved Universal Terrestrial Radio Access (E-UTRA); Medium Access Control (MAC) protocol specification (Release 12); 3GPP TS 36.321 V12.4.0, Dec. 2014, 60 pages.

* cited by examiner

PUCCH CONFIGURATION METHOD AND APPARATUS

CROSS-REFERENCE TO RELATED APPLICATIONS

This application is a continuation of International Application No. PCT/CN2015/071835, filed on Jan. 29, 2015, the disclosure of which is hereby incorporated by reference in its entirety.

TECHNICAL FIELD

Embodiments of the present invention relate to communications technologies, and in particular, to a physical uplink control channel (PUCCH for short) configuration method and apparatus.

BACKGROUND

With rapid development of wireless communications technologies, a communications system uses a carrier aggregation (CA for short) technology to support a requirement for larger bandwidth, that is, two or more carriers may be aggregated for data transmission.

In the CA technology, physical uplink shared channels (PUSCH for short) are usually configured for multiple cells in uplink, to bear uplink data sent by user equipment (UE for short) to a base station. However, a PUCCH is usually configured for only one cell in uplink, to bear uplink feedback information of all cells of the UE. The uplink feedback information is, for example, a hybrid automatic repeat request-acknowledgement (HARQ-ACK for short) and a channel quality indicator (CQI for short).

However, by means of the method in the prior art, when there is a relatively large quantity of cells of UE, load of a cell for which a PUCCH is configured by means of the method in the prior art is relatively large.

SUMMARY

Embodiments of the present invention provide a physical uplink shared channels (PUCCH) configuration method and apparatus, to reduce load of a cell for which a PUCCH is configured.

According to a first aspect, an embodiment of the present invention provides a PUCCH configuration method, including receiving, by a user equipment (UE), correspondence indication information sent by a base station, where the correspondence indication information is used to indicate a currently-used correspondence, and the correspondence includes information about a first cell and a second cell corresponding to the first cell, where the first cell is a cell for which a PUCCH is already configured, and uplink feedback information of the second cell is borne by using the PUCCH of the first cell corresponding to the second cell. The method also includes determining, by the UE according to the currently-used correspondence, a PUCCH used to send the uplink feedback information of the second cell.

With reference to the first aspect, in a first possible implementation manner of the first aspect, the correspondence indication information includes information about a currently-used first cell and a second cell corresponding to the currently-used first cell.

With reference to first aspect, in a second possible implementation manner of the first aspect, before the receiving, by UE, correspondence indication information sent by a base station, the method further includes: receiving, by the UE, a first correspondence sent by the base station, where the first correspondence includes the information about the first cell and the second cell corresponding to the first cell; and the correspondence indication information includes indication information of activating the first correspondence.

With reference to first aspect, in a third possible implementation manner of the first aspect, before the receiving, by UE, correspondence indication information sent by a base station, the method further includes: receiving, by the UE, a first correspondence and a second correspondence that are sent by the base station, where the first correspondence and the second correspondence include the information about the first cell and the second cell corresponding to the first cell, where the correspondence indication information includes indication information of activating the first correspondence or the second correspondence.

With reference to the third possible implementation manner of the first aspect, in a fourth possible implementation manner of the first aspect, the first correspondence further includes a first serial number, and the second correspondence further includes a second serial number; the indication information of activating the first correspondence or the second correspondence is serial number information of an activated correspondence; and before the determining, by the UE according to the currently-used correspondence, a PUCCH used to send the uplink feedback information of the second cell, the method further includes: activating, by the UE, a correspondence corresponding to the serial number information of the activated correspondence.

With reference to the first aspect, in a fifth possible implementation manner of the first aspect, the correspondence indication information includes information about at least one deactivated first cell; and before the determining, by the UE according to the currently-used correspondence, a PUCCH used to send the uplink feedback information of the second cell, the method further includes: deactivating, by the UE, a PUCCH of the at least one deactivated first cell, and establishing a correspondence between a second cell corresponding to the deactivated first cell and a first cell in an active state.

With reference to the first aspect, in a sixth possible implementation manner of the first aspect, the correspondence indication information includes information about at least one activated first cell; and before the determining, by the UE according to the currently-used correspondence, a PUCCH used to send the uplink feedback information of the second cell, the method further includes: activating, by the UE, a PUCCH of the at least one activated first cell, and establishing a correspondence between the activated first cell and a second cell.

With reference to any one of the first aspect, or the first to the sixth possible implementation manners of the first aspect, in a seventh possible implementation manner of the first aspect, the receiving, by a UE, correspondence indication information sent by a base station includes: receiving, by the UE at an L1 moment, the correspondence indication information by using a media access control layer control element (MAC CE) or a physical downlink control channel (PDCCH), and using, at an L1+S moment, the correspondence indicated by the correspondence indication information, where S is a positive number; or receiving, by the UE at an L1 moment, the correspondence indication information by using radio resource control RRC signaling, and using, at an L1+S moment, the correspondence indicated by the correspondence indication information.

With reference to any one of the first aspect, or the first to the seventh possible implementation manners of the first aspect, in an eighth possible implementation manner of the first aspect, the method further includes: receiving, by the UE, a deactivation indication sent by the base station, deactivating at least one first cell according to the deactivation indication, and deactivating all second cells that have a correspondence to the first cell.

With reference to any one of the first aspect, or the first to the seventh possible implementation manners of the first aspect, in a ninth possible implementation manner of the first aspect, the second cell corresponding to the first cell belongs to at least two timing advance groups: a first secondary timing advance group and a second timing advance group, and the method further includes: when an uplink time alignment timer corresponding to the first secondary timing advance group that includes the first cell expires, releasing, by the UE, a sounding reference signal (SRS) resource corresponding to a cell in the first secondary timing advance group, and performing, by the UE, at least one of the following processing: releasing, by the UE, a channel quality indicator (CQI) resource configured for the second cell corresponding to the first cell, where the second cell includes a second cell that belongs to the second timing advance group and a second cell that belongs to the first secondary timing advance group; releasing, by the UE, an SRS resource configured for a second cell that corresponds to the first cell and that belongs to the second timing advance group and/or clearing uplink authorization, downlink authorization, and/or hybrid automatic repeat request (HARQ) buffer information that correspond/corresponds to the second cell; deactivating, by the UE, the second cell that corresponds to the first cell and that belongs to the second timing advance group; stopping, by the UE, uplink transmission configured for the second cell that corresponds to the first cell and that belongs to the second timing advance group; or stopping, by the UE, an uplink time alignment timer of the second timing advance group, where all cells included in the second timing advance group are a second cell corresponding to a first cell included in the first secondary timing advance group.

With reference to the first aspect, in a tenth possible implementation manner of the first aspect, the method further includes: determining, by the UE, that a trigger condition is satisfied, and reporting power headroom (PH), where the trigger condition includes: a ratio between power headroom of any two first cells among power headroom of N first cells of the UE is greater than or equal to a first preset threshold, where N is an integer greater than or equal to 2; or power headroom of the UE is less than a second preset threshold, where the power headroom of the UE is obtained according to maximum transmit power of the UE, PUCCH power of a primary cell, PUCCH power of a secondary cell, physical uplink shared channel (PUSCH) power of the primary cell, and/or PUSCH power of the secondary cell; or the first cell of the UE is changed.

With reference to the tenth possible implementation manner of the first aspect, in an eleventh possible implementation manner of the first aspect, that the first cell of the UE is changed includes: at least one first cell of the UE is activated; or a PUCCH of at least one first cell of the UE is activated; or at least one first cell of the UE is deactivated; or a PUCCH of at least one first cell of the UE is deactivated; or a PUCCH is configured for at least one cell of the UE; or a PUCCH is de-configured for at least one first cell of the UE; or it is configured that at least one cell including a PUCCH is added for the UE.

With reference to the tenth possible implementation manner or the eleventh possible implementation manner of the first aspect, in a twelfth possible implementation manner of the first aspect, the PH includes at least one of the following information: power headroom for the UE to perform transmission by using a PUCCH of the primary cell; power headroom for the UE to perform transmission by using a PUCCH of the secondary cell; or power headroom for the UE to perform transmission by using both the PUCCH of the primary cell and the PUCCH of the secondary cell.

According to a second aspect, an embodiment of the present invention provides a PUCCH configuration method, including: determining, by a base station, correspondence indication information, where the correspondence indication information is used to indicate a currently-used correspondence of UE, and the correspondence includes information about a first cell and a second cell corresponding to the first cell, where the first cell is a cell for which a PUCCH is already configured, and uplink feedback information of the second cell is borne by using the PUCCH of the first cell corresponding to the second cell; and sending, by the base station, the correspondence indication information to the UE.

With reference to the second aspect, in a first possible implementation manner of the second aspect, the correspondence indication information includes information about a currently-used first cell and a second cell corresponding to the currently-used first cell.

With reference to second aspect, in a second possible implementation manner of the second aspect, before the sending, by the base station, the correspondence indication information to the UE, the method further includes: sending, by the base station, a first correspondence to the UE, where the first correspondence includes the information about the first cell and the second cell corresponding to the first cell; and the correspondence indication information includes indication information of activating the first correspondence.

With reference to second aspect, in a third possible implementation manner of the second aspect, before the sending, by the base station, the correspondence indication information to the UE, the method further includes: sending, by the base station, a first correspondence and a second correspondence to the UE, where the first correspondence and the second correspondence include the information about the first cell and the second cell corresponding to the first cell; and the correspondence indication information includes indication information of activating the first correspondence or the second correspondence.

With reference to the third possible implementation manner of the second aspect, in a fourth possible implementation manner of the second aspect, the first correspondence further includes a first serial number, and the second correspondence further includes a second serial number; and the indication information of activating the first correspondence or the second correspondence is serial number information of an activated correspondence.

With reference to the second aspect, in a fifth possible implementation manner of the second aspect, the correspondence indication information includes information about at least one deactivated first cell.

With reference to the second aspect, in a sixth possible implementation manner of the second aspect, the correspondence indication information includes information about at least one activated first cell.

With reference to any one of the second aspect, or the first to the sixth possible implementation manners of the second aspect, in a seventh possible implementation manner of the second aspect, the method further includes: sending, by the base station, a deactivation indication to the UE, so that the UE deactivates at least one first cell according to the deactivation indication, and deactivates all second cells that have a correspondence to the first cell.

According to a third aspect, an embodiment of the present invention provides a PUCCH configuration apparatus, where the PUCCH configuration apparatus is deployed in a UE, and includes: a receiving module, configured to receive correspondence indication information sent by a base station, where the correspondence indication information is used to indicate a currently-used correspondence, and the correspondence includes information about a first cell and a second cell corresponding to the first cell, where the first cell is a cell for which a PUCCH is already configured, and uplink feedback information of the second cell is borne by using the PUCCH of the first cell corresponding to the second cell; and a processing module, configured to determine, according to the currently-used correspondence, a PUCCH used to send the uplink feedback information of the second cell.

With reference to the third aspect, in a first possible implementation manner of the third aspect, the correspondence indication information includes information about a currently-used first cell and a second cell corresponding to the currently-used first cell.

With reference to the third aspect, in a second possible implementation manner of the third aspect, the receiving module is further configured to receive a first correspondence sent by the base station, where the first correspondence includes the information about the first cell and the second cell corresponding to the first cell; and the correspondence indication information includes indication information of activating the first correspondence.

With reference to the third aspect, in a third possible implementation manner of the third aspect, the receiving module is further configured to receive a first correspondence and a second correspondence that are sent by the base station, where the first correspondence and the second correspondence include the information about the first cell and the second cell corresponding to the first cell, where the correspondence indication information includes indication information of activating the first correspondence or the second correspondence.

With reference to the third possible implementation manner of the third aspect, in a fourth possible implementation manner of the third aspect, the first correspondence further includes a first serial number, and the second correspondence further includes a second serial number; the indication information of activating the first correspondence or the second correspondence is serial number information of an activated correspondence; and the processing module is further configured to activate a correspondence corresponding to the serial number information of the activated correspondence.

With reference to the third aspect, in a fifth possible implementation manner of the third aspect, the correspondence indication information includes information about at least one deactivated first cell; and the processing module is further configured to: deactivate a PUCCH of the at least one deactivated first cell, and establish a correspondence between a second cell corresponding to the deactivated first cell and a first cell in an active state.

With reference to the third aspect, in a sixth possible implementation manner of the third aspect, the correspondence indication information includes information about at least one activated first cell; and the processing module is further configured to: activate a PUCCH of the at least one activated first cell, and establish a correspondence between the activated first cell and a second cell.

With reference to any one of the third aspect, or the first to the sixth possible implementation manners of the third aspect, in a seventh possible implementation manner of the third aspect, the receiving module is specifically configured to: receive, at an L1 moment, the correspondence indication information by using a MAC CE or a PDCCH, and use, at an L1+S moment, the correspondence indicated by the correspondence indication information, where S is a positive number; or receive, at an L1 moment, the correspondence indication information by using radio resource control RRC signaling, and use, at an L1+S moment, the correspondence indicated by the correspondence indication information.

With reference to any one of the third aspect, or the first to the seventh possible implementation manners of the third aspect, in an eighth possible implementation manner of the third aspect, the receiving module is further configured to receive a deactivation indication sent by the base station, and the processing module is further configured to: deactivate at least one first cell according to the deactivation indication, and deactivate all second cells that have a correspondence to the first cell.

With reference to any one of the third aspect, or the first to the seventh possible implementation manners of the third aspect, in a ninth possible implementation manner of the third aspect, the second cell corresponding to the first cell belongs to at least two timing advance groups: a first secondary timing advance group and a second timing advance group, and the processing module is further configured to: when an uplink time alignment timer corresponding to the first secondary timing advance group that includes the first cell expires, release, by the processing module, an SRS resource corresponding to a cell in the first secondary timing advance group, and perform, by the processing module, at least one of the following processing: releasing, by the processing module, a CQI resource configured for the second cell corresponding to the first cell, where the second cell includes a second cell that belongs to the second timing advance group and a second cell that belongs to the first secondary timing advance group; releasing, by the processing module, an SRS resource configured for a second cell that corresponds to the first cell and that belongs to the second timing advance group and/or clearing uplink authorization, downlink authorization, and/or HARQ buffer information that correspond/corresponds to the second cell; deactivating, by the processing module, the second cell that corresponds to the first cell and that belongs to the second timing advance group; stopping, by the processing module, uplink transmission configured for the second cell that corresponds to the first cell and that belongs to the second timing advance group; or stopping, by the processing module, an uplink time alignment timer of the second timing advance group, where all cells included in the second timing advance group are a second cell corresponding to a first cell included in the first secondary timing advance group.

With reference to the third aspect, in a tenth possible implementation manner of the third aspect, the apparatus further includes: a sending module, configured to: determine that a trigger condition is satisfied, and report PH, where the trigger condition includes: a ratio between power headroom of any two first cells among power headroom of N first cells of the UE is greater than or equal to a first preset threshold, where N is an integer greater than or equal to 2; or power headroom of the UE is less than a second preset threshold, where the power headroom of the UE is obtained according to maximum transmit power of the UE, PUCCH power of a primary cell, PUCCH power of a secondary cell, PUSCH power of the primary cell, and/or PUSCH power of the secondary cell; or the first cell of the UE is changed.

With reference to the tenth possible implementation manner of the third aspect, in an eleventh possible implementation manner of the third aspect, that the first cell of the UE is changed includes: at least one first cell of the UE is activated; or a PUCCH of at least one first cell of the UE is activated; or at least one first cell of the UE is deactivated; or a PUCCH of at least one first cell of the UE is deactivated; or a PUCCH is configured for at least one cell of the UE; or a PUCCH is de-configured for at least one first cell of the UE; or it is configured that at least one cell including a PUCCH is added for the UE.

With reference to the tenth possible implementation manner or the eleventh possible implementation manner of the third aspect, in a twelfth possible implementation manner of the third aspect, the PH includes at least one of the following information: power headroom for the UE to perform transmission by using a PUCCH of the primary cell; power headroom for the UE to perform transmission by using a PUCCH of the secondary cell; or power headroom for the UE to perform transmission by using both the PUCCH of the primary cell and the PUCCH of the secondary cell.

According to a fourth aspect, an embodiment of the present invention provides a PUCCH configuration apparatus, where the PUCCH configuration apparatus is deployed in a base station, and includes: a processing module, configured to determine correspondence indication information, where the correspondence indication information is used to indicate a currently-used correspondence of UE, and the correspondence includes information about a first cell and a second cell corresponding to the first cell, where the first cell is a cell for which a PUCCH is already configured, and uplink feedback information of the second cell is borne by using the PUCCH of the first cell corresponding to the second cell; and a sending module, configured to send the correspondence indication information to the UE.

With reference to the fourth aspect, in a first possible implementation manner of the fourth aspect, the correspondence indication information includes information about a currently-used first cell and a second cell corresponding to the currently-used first cell.

With reference to the fourth aspect, in a second possible implementation manner of the fourth aspect, the sending module is further configured to send a first correspondence to the UE, where the first correspondence includes the information about the first cell and the second cell corresponding to the first cell; and the correspondence indication information includes indication information of activating the first correspondence.

With reference to the fourth aspect, in a third possible implementation manner of the fourth aspect, the sending module is further configured to send a first correspondence and a second correspondence to the UE, where the first correspondence and the second correspondence include the information about the first cell and the second cell corresponding to the first cell; and the correspondence indication information includes indication information of activating the first correspondence or the second correspondence.

With reference to the third possible implementation manner of the fourth aspect, in a fourth possible implementation manner of the fourth aspect, the first correspondence further includes a first serial number, and the second correspondence further includes a second serial number; and the indication information of activating the first correspondence or the second correspondence is serial number information of an activated correspondence.

With reference to the fourth aspect, in a fifth possible implementation manner of the fourth aspect, the correspondence indication information includes information about at least one deactivated first cell.

With reference to the fourth aspect, in a sixth possible implementation manner of the fourth aspect, the correspondence indication information includes information about at least one activated first cell.

With reference to any one of the fourth aspect, or the first to the sixth possible implementation manners of the fourth aspect, in a seventh possible implementation manner of the fourth aspect, the sending module is further configured to send a deactivation indication to the UE, so that the UE deactivates at least one first cell according to the deactivation indication, and deactivates all second cells that have a correspondence to the first cell.

According to a fifth aspect, an embodiment of the present invention provides a PUCCH configuration apparatus, where the PUCCH configuration apparatus is deployed in a UE, and includes: a receiver, configured to receive correspondence indication information sent by a base station, where the correspondence indication information is used to indicate a currently-used correspondence, and the correspondence includes information about a first cell and a second cell corresponding to the first cell, where the first cell is a cell for which a PUCCH is already configured, and uplink feedback information of the second cell is borne by using the PUCCH of the first cell corresponding to the second cell; and a processor, configured to determine, according to the currently-used correspondence, a PUCCH used to send the uplink feedback information of the second cell.

With reference to the fifth aspect, in a first possible implementation manner of the fifth aspect, the correspondence indication information includes information about a currently-used first cell and a second cell corresponding to the currently-used first cell.

With reference to the fifth aspect, in a second possible implementation manner of the fifth aspect, the receiver is further configured to receive a first correspondence sent by the base station, where the first correspondence includes the information about the first cell and the second cell corresponding to the first cell; and the correspondence indication information includes indication information of activating the first correspondence.

With reference to the fifth aspect, in a third possible implementation manner of the fifth aspect, the receiver is further configured to receive a first correspondence and a second correspondence that are sent by the base station, where the first correspondence and the second correspondence include the information about the first cell and the second cell corresponding to the first cell, where the correspondence indication information includes indication information of activating the first correspondence or the second correspondence.

With reference to the third possible implementation manner of the fifth aspect, in a fourth possible implementation manner of the fifth aspect, the first correspondence further includes a first serial number, and the second correspondence further includes a second serial number; the indication information of activating the first correspondence or the second correspondence is serial number information of an activated correspondence; and the processor is further configured to activate a correspondence corresponding to the serial number information of the activated correspondence.

With reference to the fifth aspect, in a fifth possible implementation manner of the fifth aspect, the correspondence indication information includes information about at least one deactivated first cell; the processor is further configured to: deactivate a PUCCH of the at least one deactivated first cell, and establish a correspondence between a second cell corresponding to the deactivated first cell and a first cell in an active state.

With reference to the fifth aspect, in a sixth possible implementation manner of the fifth aspect, the correspondence indication information includes information about at least one activated first cell; and the processor is further configured to: activate a PUCCH of the at least one activated first cell, and establish a correspondence between the activated first cell and a second cell.

With reference to any one of the fifth aspect, or the first to the sixth possible implementation manners of the fifth aspect, in a seventh possible implementation manner of the fifth aspect, the receiver is specifically configured to: receive, at an L1 moment, the correspondence indication information by using a MAC CE or a PDCCH, and use, at an L1+S moment, the correspondence indicated by the correspondence indication information, where S is a positive number; or receive, at an L1 moment, the correspondence indication information by using radio resource control RRC signaling, and use, at an L1+S moment, the correspondence indicated by the correspondence indication information.

With reference to any one of the fifth aspect, or the first to the seventh possible implementation manners of the fifth aspect, in an eighth possible implementation manner of the fifth aspect, the receiver is further configured to receive a deactivation indication sent by the base station, and the processor is further configured to: deactivate at least one first cell according to the deactivation indication, and deactivate all second cells that have a correspondence to the first cell.

With reference to any one of the fifth aspect, or the first to the seventh possible implementation manners of the fifth aspect, in a ninth possible implementation manner of the fifth aspect, the second cell corresponding to the first cell belongs to at least two timing advance groups: a first secondary timing advance group and a second timing advance group, and the processor is further configured to: when an uplink time alignment timer corresponding to the first secondary timing advance group that includes the first cell expires, release, by the processor, an SRS resource corresponding to a cell in the first secondary timing advance group, and perform, by the processor, at least one of the following processing: releasing, by the processor, a CQI resource configured for the second cell corresponding to the first cell, where the second cell includes a second cell that belongs to the second timing advance group and a second cell that belongs to the first secondary timing advance group; releasing, by the processor, an SRS resource configured for a second cell that corresponds to the first cell and that belongs to the second timing advance group and/or clearing uplink authorization, downlink authorization, and/or HARQ buffer information that correspond/corresponds to the second cell; deactivating, by the processor, the second cell that corresponds to the first cell and that belongs to the second timing advance group; stopping, by the processor, uplink transmission configured for the second cell that corresponds to the first cell and that belongs to the second timing advance group; or stopping, by the processor, an uplink time alignment timer of the second timing advance group, where all cells included in the second timing advance group are a second cell corresponding to a first cell included in the first secondary timing advance group.

With reference to the fifth aspect, in a tenth possible implementation manner of the fifth aspect, the apparatus further includes: a transmitter, configured to: determine that a trigger condition is satisfied, and report PH, where the trigger condition includes: a ratio between power headroom of any two first cells among power headroom of N first cells of the UE is greater than or equal to a first preset threshold, where N is an integer greater than or equal to 2; or power headroom of the UE is less than a second preset threshold, where the power headroom of the UE is obtained according to maximum transmit power of the UE, PUCCH power of a primary cell, PUCCH power of a secondary cell, PUSCH power of the primary cell, and/or PUSCH power of the secondary cell; or the first cell of the UE is changed.

With reference to the tenth possible implementation manner of the fifth aspect, in an eleventh possible implementation manner of the fifth aspect, that the first cell of the UE is changed includes: at least one first cell of the UE is activated; or a PUCCH of at least one first cell of the UE is activated; or at least one first cell of the UE is deactivated; or a PUCCH of at least one first cell of the UE is deactivated; or a PUCCH is configured for at least one cell of the UE; or a PUCCH is de-configured for at least one first cell of the UE; or it is configured that at least one cell including a PUCCH is added for the UE.

With reference to the tenth possible implementation manner or the eleventh possible implementation manner of the fifth aspect, in a twelfth possible implementation manner of the fifth aspect, the PH includes at least one of the following information: power headroom for the UE to perform transmission by using a PUCCH of the primary cell; power headroom for the UE to perform transmission by using a PUCCH of the secondary cell; or power headroom for the UE to perform transmission by using both the PUCCH of the primary cell and the PUCCH of the secondary cell.

According to a sixth aspect, an embodiment of the present invention provides a PUCCH configuration apparatus, where the PUCCH configuration apparatus is deployed in a base station, and includes: a processor, configured to determine correspondence indication information, where the correspondence indication information is used to indicate a currently-used correspondence of UE, and the correspondence includes information about a first cell and a second cell corresponding to the first cell, where the first cell is a cell for which a PUCCH is already configured, and uplink feedback information of the second cell is borne by using the PUCCH of the first cell corresponding to the second cell; and a transmitter, configured to send the correspondence indication information to the UE.

With reference to the sixth aspect, in a first possible implementation manner of the sixth aspect, the correspondence indication information includes information about a currently-used first cell and a second cell corresponding to the currently-used first cell.

With reference to the sixth aspect, in a second possible implementation manner of the sixth aspect, the transmitter is further configured to send a first correspondence to the UE, where the first correspondence includes the information about the first cell and the second cell corresponding to the first cell; and the correspondence indication information includes indication information of activating the first correspondence.

With reference to the sixth aspect, in a third possible implementation manner of the sixth aspect, the transmitter is further configured to send a first correspondence and a second correspondence to the UE, where the first correspondence and the second correspondence include the information about the first cell and the second cell corresponding to the first cell; and the correspondence indication information includes indication information of activating the first correspondence or the second correspondence.

With reference to the third possible implementation manner of the sixth aspect, in a fourth possible implementation manner of the sixth aspect, the first correspondence further includes a first serial number, and the second correspondence further includes a second serial number; the indication information of activating the first correspondence or the second correspondence is serial number information of an activated correspondence.

With reference to the sixth aspect, in a fifth possible implementation manner of the sixth aspect, the correspondence indication information includes information about at least one deactivated first cell.

With reference to the sixth aspect, in a sixth possible implementation manner of the sixth aspect, the correspondence indication information includes information about at least one activated first cell.

With reference to any one of the sixth aspect, or the first to the sixth possible implementation manners of the sixth aspect, in a seventh possible implementation manner of the sixth aspect, the transmitter is further configured to send a deactivation indication to the UE, so that the UE deactivates at least one first cell according to the deactivation indication, and deactivates all second cells that have a correspondence to the first cell.

By means of the PUCCH configuration method and apparatus provided in the embodiments of the present invention, UE receives correspondence indication information sent by a base station, where the correspondence indication information is used to indicate a currently-used correspondence, and the UE determines, according to the currently-used correspondence, a PUCCH used to send uplink feedback information of a second cell. By setting a correspondence between a first cell and a second cell, PUCCHs can be configured for multiple cells of UE, and the PUCCHs of the multiple cells jointly bear uplink feedback information, to reduce load of the cells for which the PUCCHs are configured. In addition, a used correspondence can be adjusted by using correspondence indication information such as activation or deactivation, thereby quickly and dynamically adjusting the used correspondence.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present embodiments.

In the present embodiments, physical uplink control channels (PUCCHs) are configured for multiple (at least two) cells of the same user equipment (UE), a correspondence is established between a PUCCH of each cell and a cell that bears uplink feedback information by using the PUCCH of the cell, and a PUCCH is determined, according to the correspondence, a PUCCH used to bear uplink feedback information of each cell. In this way, uplink feedback information is borne by using multiple PUCCHs, to reduce load of a cell for which a PUCCH is configured.

The following describes in detail the technical solutions of the present embodiments by using specific embodiments. The following several specific embodiments may be combined with each other, and a same or similar concept or process may be not described again in some embodiments.

Activation/deactivation described in the following embodiments in this specification may include: activating/deactivating a PUCCH of a cell, or activating/deactivating uplink and/or downlink of a cell. The activating/deactivating a PUCCH of a cell includes starting/stopping PUCCH sending of the cell without affecting an uplink/downlink data transmission status of the cell. The activating uplink of a cell includes starting PUCCH sending and uplink data transmission of the cell. The activating downlink of a cell includes starting downlink data transmission of the cell. The activating uplink and downlink of a cell includes starting PUCCH sending, uplink data transmission, and downlink data transmission of the cell. The deactivating uplink of a cell includes stopping PUCCH sending and uplink data transmission of the cell. The deactivating downlink of a cell includes stopping downlink data transmission of the cell. The deactivating uplink and downlink of a cell includes stopping PUCCH sending, uplink data transmission, and downlink data transmission of the cell.

Figure 1:
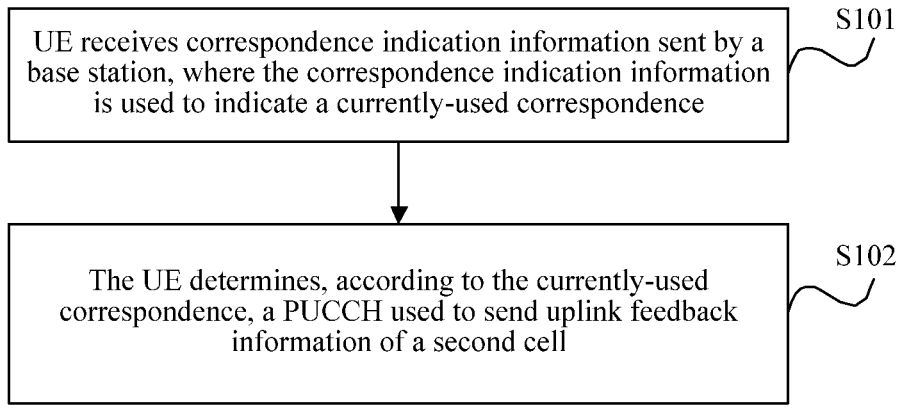
FIG. 1 is a schematic flowchart of Embodiment 1 of a physical uplink control channel (PUCCH) configuration method according to the present embodiments.

FIG. 1 is a schematic flowchart of Embodiment 1 of a PUCCH configuration method according to the present embodiments. As shown in FIG. 1, this embodiment is executed by UE, and the method in this embodiment is as follows.

S101: The UE receives correspondence indication information sent by a base station, where the correspondence indication information is used to indicate a currently-used correspondence.

The correspondence includes information about a first cell and a second cell corresponding to the first cell. The first cell is a cell for which a PUCCH is already configured, and uplink feedback information of the second cell is borne by using the PUCCH of the first cell corresponding to the second cell. The uplink feedback information may include channel status indication information (CSI for short), channel quality indication information (CQI for short), and acknowledgement (ACK for short) and/or negative acknowledgement (NACK for short) information. The second cell is a cell for which a PUCCH is configured or a cell for which a PUCCH is not configured. One first cell may correspond to one or more second cells, and a second cell and a first cell may be a same cell.

Specifically, that the correspondence indication information is used to indicate a currently-used correspondence includes, but is not limited to, the following implementation manners.

A first implementation manner: The correspondence indication information includes information about a currently-used first cell and a second cell corresponding to the currently-used first cell. That is, the correspondence indication information directly includes information about a currently-used first cell and a second cell corresponding to the currently-used first cell, to indicate the currently-used correspondence.

It is assumed that, the base station configures multiple cells for the UE, for example, eight cells, which are respectively a cell 1, a cell 2, a cell 3, a cell 4, a cell 5, a cell 6, a cell 7, and a cell 8, where the cell 1 is a primary cell, the other cells are secondary cells, and PUCCHs are already configured for the cell 1 and the cell 5. In this case, the cell 1 and the cell 5 are first cells, and the cell 1, the cell 2, the cell 3, the cell 4, the cell 5, the cell 6, the cell 7, and the cell 8 are second cells. It is assumed that, the cell 1 and the cell 5 are activated first cells, uplink feedback information of the cell 1, the cell 2, the cell 3, and the cell 4 are borne by using the PUCCH of the cell 1, and uplink feedback information of the cell 5, the cell 6, the cell 7, and the cell 8 are borne by using the PUCCH of the cell 5. In this case, second cells corresponding to the first cell cell 1 are the cell 1, the cell 2, the cell 3, and the cell 4, and cells corresponding to the first cell cell 5 are the cell 5, the cell 6, the cell 7, and the cell 8. Alternatively, the cell 1, the cell 2, the cell 3, the cell 4, and the cell 5 perform feedback by using the cell 1, and the cell 6, the cell 7, and the cell 8 perform feedback by using the cell 5.

It should be noted that, assuming that there are R first cells, where R is an integer greater than or equal to 2, R correspondences may be configured, or only R−1 correspondences may be configured, and it is default that there is a correspondence between a first cell for which a correspondence is not configured and another second cell for which a correspondence is not configured, or it is default that a second cell that includes a secondary carrier of a PUCCH uses a PUCCH of a carrier on which the PUCCH is located or uses a PUCCH of a primary cell to perform feedback. Using the example in the previous paragraph as an example, the first cells are the cell 1 and the cell 5, and only a correspondence between the cell 1 and the cell 5, the cell 2, the cell 3, and the cell 4 may be indicated. In this case, it is default that there is a correspondence between the cell 5 for which a correspondence is not configured and the cell 5, the cell 6, the cell 7, and the cell 8 for which a correspondence is not configured. Alternatively, only a correspondence between the cell 5 and the cell 5, the cell 6, the cell 7, and the cell 8 may be indicated. In this case, it is default that there is a correspondence between the cell 1 for which a correspondence is not configured and the cell 1, the cell 2, the cell 3, and the cell 4 for which a correspondence is not configured. Alternatively, it is default that the cell 5 uses the cell 5 to perform feedback. In this case, only the cell 6, the cell 7, and the cell 8 are configured to use the cell 5 to perform feedback, and the UE may determine that the cell 1, the cell 2, the cell 3, and the cell 4 use the cell 1 to perform feedback, and the cell 5, the cell 6, the cell 7, and the cell 8 use the cell 5 to perform feedback. Alternatively, it is default that the cell 5 uses the cell 1 to perform feedback. In this case, only the cell 6, the cell 7, and the cell 8 are configured to use the cell 5 to perform feedback, and the UE may determine that the cell 1, the cell 2, the cell 3, the cell 4, and the cell 5 use the cell 1 to perform feedback, and the cell 6, the cell 7, and the cell 8 use the cell 5 to perform feedback.

A second implementation manner: Before the UE receives the correspondence indication information sent by the base station, the UE receives a first correspondence sent by the base station, where the first correspondence includes the information about the first cell and the second cell corresponding to the first cell; and the correspondence indication information includes indication information of activating the first correspondence. This is equivalent to that the base station sends a correspondence to the UE in advance, and then sends indication information of activating the correspondence.

A third implementation manner: Before the UE receives the correspondence indication information sent by the base station, the UE receives a first correspondence and a second correspondence that are sent by the base station, where the first correspondence and the second correspondence include the information about the first cell and the second cell corresponding to the first cell; and the correspondence indication information includes indication information of activating the first correspondence or the second correspondence.

Further, the first correspondence further includes a first serial number, and the second correspondence further includes a second serial number. The indication information of activating the first correspondence or the second correspondence may be specifically serial number information of an activated correspondence. After the receiving, by UE, correspondence indication information sent by a base station, the method further includes: activating, by the UE, a correspondence corresponding to the serial number information that is of the activated correspondence and that is carried in the indication information.

That is, the UE receives multiple groups of correspondences, and each group of correspondences corresponds to a serial number. The base station instructs, by including serial number information of an activated correspondence in the correspondence indication information, the UE to use which group of correspondences.

For example, the first correspondence is: the cell 1 corresponds to the cell 1, the cell 2, the cell 3, and the cell 4; and the cell 5 corresponds to the cell 5, the cell 6, the cell 7, and the cell 8, and the first serial number included in the first correspondence is K1. The second correspondence is: the cell 1 corresponds to the cell 1, the cell 2, the cell 3, and the cell 4; the cell 5 corresponds to the cell 5 and the cell 8; and the cell 6 corresponds to the cell 6 and the cell 7, and the second serial number included in the second correspondence is K2. The activated correspondence included in the correspondence indication information is K2. In this case, the second correspondence is activated. In this case, the used correspondence is: the cell 1 corresponds to the cell 1, the cell 2, the cell 3, and the cell 4; the cell 5 corresponds to the cell 5 and the cell 8; and the cell 6 corresponds to the cell 6 and the cell 7.

A fourth implementation manner: The correspondence indication information includes information about at least one deactivated first cell. After the receiving, by UE, correspondence indication information sent by a base station, the method further includes: deactivating, by the UE, a PUCCH of the at least one deactivated first cell, and establishing a correspondence between a second cell corresponding to the deactivated first cell and a first cell in an active state.

For example, an activated first cell is the cell 1 and the cell 5, and the correspondence indication information includes information of deactivating the cell 5, where the deactivating the cell 5 refers to deactivating the PUCCH of the cell 5.

In response to the information about the at least one deactivated first cell included in the correspondence indication information, the UE deactivates the PUCCH of the at least one deactivated first cell, and establishes the correspondence between the second cell corresponding to the deactivated first cell and the activated first cell.

Using one deactivated first cell as an example, the deactivating may include deactivating a PUCCH of the first cell or deactivating uplink and downlink transmission of the first cell. For example, the PUCCH of the cell 5 is deactivated, and the UE deactivates the PUCCH of the cell5, and establishes a correspondence between the cell 5, the cell 6, the cell 7, and the cell 8 that correspond to the cell 5 and the activated cell 1. In this case, the first cell in the used correspondence is only the cell 1, the information about the first cell and the second cell corresponding to the first cell is that the cell 1 corresponds to the cell 1, the cell 2, the cell 3, the cell 4, the cell 5, the cell 6, the cell 7, and the cell 8, that is, uplink feedback information of the cell 1, the cell 2, the cell 3, the cell 4, the cell 5, the cell 6, the cell 7, and the cell 8 is all borne by using the PUCCH of the cell 1. Alternatively, uplink and downlink transmission of the cell 5 is deactivated, and the UE deactivates both uplink and downlink of the cell 5, and establishes a correspondence between the cell 6, the cell 7, and the cell 8 that correspond to the cell 5 and the activated cell 1; that is, uplink feedback information of the cell 1, the cell 2, the cell 3, the cell 4, the cell 6, the cell 7, and the cell 8 is all borne by using the PUCCH of the cell 1. The cell 5 is deactivated, and therefore a correspondence does not need to be adjusted.

If there are multiple activated first cells, for example, there are five activated first cells, and three first cells are deactivated in this step, PUCCHs of the three first cells are deactivated, and a second cell corresponding to the three deactivated first cells is adjusted to an activated first cell (that is, the two first cells that are not deactivated). Specifically, the base station may instruct how to adjust, or an adjustment rule may be preset and adjustment is performed according to the adjustment rule. This is not limited in the present embodiments.

Optionally, after receiving the information about the deactivated first cell, the UE stops sending of a sounding reference signal (SRS for short) and a scheduling request (SR for short) of the deactivated first cell.

A fifth implementation manner: The correspondence indication information includes information about at least one activated first cell. After the receiving, by UE, correspondence indication information sent by a base station, the method further includes: activating, by the UE, a PUCCH of the at least one activated first cell, and establishing a correspondence between the activated first cell and a second cell. The correspondence between the activated first cell and the second cell may be configured by the base station for the UE in advance, or carried in the activation indication. Alternatively, the correspondence may be based on a predefined rule.

For example, the activated first cell is the cell 1 and the cell 5, and the correspondence indication information includes information of activating the cell 6, where the activating the cell 6 refers to activating a PUCCH of the cell 6.

Using activating one first cell as an example, for example, the cell 6 is activated. The UE activates the PUCCH of the cell 6, establishes a correspondence between the cell 6 and the cell 6 and the cell 7, and adjusts a correspondence between the cell 5 and the cell 5, the cell 6, the cell 7, and the cell 8 to a correspondence between the cell 5 and the cell 5 and the cell 8. In this case, the used correspondence is: the cell 1 corresponds to the cell 1, the cell 2, the cell 3, and the cell 4; the cell 5 corresponds to the cell 5 and the cell 8; and the cell 6 corresponds to the cell 6 and the cell 7.

If the at least one activated first cell is two or more, the UE activates PUCCHs of the at least one activated first cell, establishes a correspondence between the activated first cells and a second cell, and deletes a prior correspondence between the activated first cells and a second cell corresponding to the activated first cells. Specifically, the base station may instruct to establish the correspondence between the activated first cell and the second cell, or a rule may be predefined and the correspondence is established according to the predefined rule. This is not limited in the present embodiments.

How does the correspondence indication information indicate the currently-used correspondence is not limited in the present embodiments, provided that the information about the first cell and the second cell corresponding to the first cell can be deduced according to the information.

S102: The UE determines, according to the currently-used correspondence, a PUCCH used to send uplink feedback information of a second cell.

According to the example in S101, for the first implementation manner or the second implementation manner, the used correspondence is: the cell 1 corresponds to the cell 1, the cell 2, the cell 3, and the cell 4; and the cell 5 corresponds to the cell 5, the cell 6, the cell 7, and the cell 8. Therefore, uplink feedback information of the cell 1, the cell 2, the cell 3, or the cell 4 is sent by using the PUCCH of the cell 1. Uplink feedback information of the cell 5, the cell 6, the cell 7, or the cell 8 is sent by using the PUCCH of the cell 5.

For the third implementation manner, the used correspondence is: the cell 1 corresponds to the cell 1, the cell 2, the cell 3, and the cell 4; the cell 5 corresponds to the cell 5 and the cell 8; and the cell 6 corresponds to the cell 6 and the cell 7. Therefore, uplink feedback information of the cell 1, the cell 2, the cell 3, or the cell 4 is sent by using the PUCCH of the cell 1; uplink feedback information of the cell 5 or the cell 8 is sent by using the PUCCH of the cell 5; and uplink feedback information of the cell 6 or the cell 7 is sent by using the PUCCH of the cell 6.

For the fourth implementation manner, the used correspondence is: the cell 1 corresponds to the cell 1, the cell 2, the cell 3, the cell 4, the cell 5, the cell 6, the cell 7, and the cell 8. Therefore, uplink feedback information of the cell 1, the cell 2, the cell 3, the cell 4, the cell 5, the cell 6, the cell 7, and the cell 8 is sent by using the PUCCH of the cell 1.

For the fourth implementation manner, the used correspondence is: the cell 1 corresponds to the cell 1, the cell 2, the cell 3, and the cell 4; the cell 5 corresponds to the cell 5 and the cell 8; and the cell 6 corresponds to the cell 6 and the cell 7. Therefore, uplink feedback information of the cell 1, the cell 2, the cell 3, and the cell 4 is sent by using the PUCCH of the cell 1; uplink feedback information of the cell 5 and the cell 8 is sent by using the PUCCH of the cell 5; and uplink feedback information of the cell 6 and the cell 7 is sent by using the PUCCH of the cell 6.

In this embodiment, UE receives correspondence indication information sent by a base station, where the correspondence indication information is used to indicate a currently-used correspondence, and the UE determines, according to the currently-used correspondence, a PUCCH used to send uplink feedback information of a second cell. By setting a correspondence between a first cell and a second cell, PUCCHs can be configured for multiple cells of UE, and the PUCCHs of the multiple cells jointly bear uplink feedback information, to reduce load of the cells for which the PUCCHs are configured. In addition, a used correspondence can be adjusted by using correspondence indication information such as activation or deactivation, thereby quickly and dynamically adjusting the used correspondence.

In the foregoing embodiment, the UE receives, at an L1 moment, the correspondence indication information by using a media access control layer control element (MAC CE for short) or a physical downlink control channel (PDCCH), and uses, at an L1+S moment, the correspondence indicated by the correspondence indication information, where S is a positive number.

Alternatively, it may be that the UE receives, at an L1 moment, the correspondence indication information by using radio resource control (RRC for short) signaling, and uses, at an L1+S moment, the correspondence indicated by the correspondence indication information. More specifically, the correspondence indication information sent by the base station may be received in the L1$^{th}$ frame, and the correspondence indicated by the correspondence indication information may start to be used after a delay of S frames.

In the foregoing embodiment, the method further includes: sending, by the base station, a deactivation indication to the UE, and receiving, by the UE, the deactivation indication from the base station, deactivating at least one first cell according to the deactivation indication, and deactivating all second cells that have a correspondence to the first cell. For example, the used correspondence is: the cell 1 corresponds to the cell 1, the cell 2, the cell 3, and the cell 4; and the cell 5 corresponds to the cell 5, the cell 6, the cell 7, and the cell 8, and the deactivation indication instructs to deactivate the cell 5. In this case, the cell 5 is deactivated, and the cell 5, the cell 6, the cell 7, and the cell 8 corresponding to the cell 5 are deactivated. That is, a first cell of the UE in an active state is only the cell 1, and a second cell in an active state is only the cell 1, the cell 2, the cell 3, and the cell 4.

In the foregoing embodiment, the second cell corresponding to the first cell belongs to at least two timing advance groups: a first secondary timing advance group and a second timing advance group. The first secondary timing advance group includes at least the first cell, and the first cell is a secondary cell. The second timing advance group includes another second cell that is different from a second cell included in the first secondary timing advance group. The method further includes: when an uplink time alignment timer corresponding to the first secondary timing advance group (sTAG for short) that includes the first cell expires, releasing, by the UE, a sounding reference signal (SRS for short) resource corresponding to a cell in the first secondary timing advance group, where the first secondary timing advance group and the second timing advance group are different timing advance groups, which more specifically indicates that different timers are used. Further, the method further includes: performing, by the UE, at least one of the following processing: 1) releasing, by the UE, a channel quality indicator (CQI for short) resource configured for the second cell corresponding to the first cell, where the second cell includes a second cell that belongs to the second timing advance group and a second cell that belongs to the first secondary timing advance group; 2) releasing, by the UE, an SRS resource configured for a second cell that corresponds to the first cell and that belongs to the second timing advance group and/or clearing uplink authorization, downlink authorization, and/or hybrid HARQ buffer information that correspond/corresponds to the second cell; 3) deactivating, by the UE, the second cell that corresponds to the first cell and that belongs to the second timing advance group; 4) stopping, by the UE, uplink transmission configured for the second cell that corresponds to the first cell and that belongs to the second timing advance group; or 5) stopping, by the UE, an uplink time alignment timer of the second timing advance group, where all cells included in the second timing advance group are a second cell corresponding to a first cell included in the first secondary timing advance group.

Specifically, in an existing LTE system, UE receives a time alignment command sent by a base station, then adjusts an uplink sending timing advance of the UE, and the UE determines an uplink sending time according to downlink timing information and the uplink sending timing advance. Different serving cells are grouped into different timing advance groups (TAG for short) according to different uplink sending timing advances. Serving cells in a same TAG have a same timing advance. For example, a primary timing advance group (pTAG for short) indicates a TAG group including a primary cell, and a secondary timing advance group (sTAG for short) indicates a TAG group including a secondary cell. For one UE, there is only one pTAG, and there may be multiple sTAGs. The pTAG includes a PUCCH of the primary cell. When more than one PUCCH is configured, the sTAG may also include a secondary cell for which a PUCCH is configured. For each TAG group, the UE maintains an uplink time alignment timer, and the UE restarts the uplink time alignment timer when receiving a time alignment command. If the UE does not receive a time alignment command within a time length of the time alignment timer, the UE determines that the time alignment timer expires, and clears a hybrid automatic repeat request (HARQ for short) buffer of a serving cell included in the TAG corresponding to the uplink time alignment timer. When an uplink time alignment timer corresponding to a sTAG that includes a secondary cell for which a PUCCH is configured is configured, not only uplink transmission of this TAG is affected, but also uplink transmission of another second cell that corresponds to the PUCCH and that does not belong to this TAG is affected. In this embodiment, a processing process of the UE is designed for a case in which an uplink time alignment timer corresponding to a sTAG that includes a secondary cell for which a PUCCH is configured is configured.

It is assumed that, the base station configures multiple cells for the UE, for example, eight cells, which are respectively a cell 1, a cell 2, a cell 3, a cell 4, a cell 5, a cell 6, a cell 7, and a cell 8, where the cell 1 is a primary cell, the other cells are secondary cells, and PUCCHs are already configured for the cell 1 and the cell 5. In this case, the cell 1 and the cell 5 are first cells. It is assumed that, the cell 1 and the cell 5 are activated first cells, uplink feedback information of the cell 1, the cell 2, the cell 3, and the cell 4 are borne by using the PUCCH of the cell 1, and uplink feedback information of the cell 5, the cell 6, the cell 7, and the cell 8 are borne by using the PUCCH of the cell 5. In this case, second cells corresponding to the first cell cell 1 are the cell 1, the cell 2, the cell 3, and the cell 4, and cells corresponding to the first cell cell 5 are the cell 5, the cell 6, the cell 7, and the cell 8. In addition, a pTAG includes the cell 1, the cell 2, the cell 3, and the cell 4; a sTAG 1 includes the cell 5 and the cell 6; and a sTAG 3 includes the cell 7 and the cell 8. When an uplink time alignment timer corresponding to the sTAG 1 is configured, the UE releases an SRS resource corresponding to the cells cell 5 and cell 6 included in the sTAG 1. Further, the UE releases a CQI resource configured for the second cells cell 5, cell 6, cell 7, and cell 8 corresponding to the cell 5, and/or, the UE releases an SRS resource corresponding to the cell 7 and the cell 8. Alternatively, the UE directly deactivates the cell 7 and the cell 8.

Based on the foregoing embodiment, this embodiment of the present invention further provides a power headroom report (PHR for short) method, so that the base station performs scheduling according to a PHR. When the UE determines that the following trigger condition is satisfied, the UE reports power headroom (PH for short), where the trigger condition includes any one of the following conditions.

1. A PHR timer expires.
2. A ratio between power headroom of any two first cells among power headroom of N first cells of the UE is greater than or equal to a first preset threshold, where N is an integer greater than or equal to 2.

When the ratio between power headroom of any two first cells is greater than or equal to the first preset threshold, it indicates that load between cells are unbalanced, and PH should be reported, so that the base station adjusts PUCCH configuration according to the reported PH.

3. Power headroom of the UE is less than a second preset threshold.

The power headroom of the UE is obtained according to maximum transmit power of the UE, PUCCH power of a primary cell, PUCCH power of a secondary cell, physical uplink shared channel (PUSCH for short) power of the primary cell, and/or PUSCH power of the secondary cell.

4. The first cell of the UE is changed.

That the first cell of the UE is changed includes: at least one first cell of the UE is activated; or a PUCCH of at least one first cell of the UE is activated; or at least one first cell of the UE is deactivated; or a PUCCH of at least one first cell of the UE is deactivated; or a PUCCH is configured for at least one cell of the UE; or a PUCCH is de-configured for at least one first cell of the UE; or it is configured that at least one cell including a PUCCH is added for the UE.

The PH in the foregoing embodiment includes at least one of the following information: power headroom for the UE to perform transmission by using a PUCCH of the primary cell; power headroom for the UE to perform transmission by using a PUCCH of the secondary cell; or power headroom for the UE to perform transmission by using both the PUCCH of the primary cell and the PUCCH of the secondary cell.

The UE is triggered, by using the foregoing trigger condition, to report the PH to the base station. The base station learns, according to the PH reported by the UE, a load status of a cell for which a PUCCH is already configured, and adjusts PUCCH configuration according to the PH. In this way, the PUCCH configuration is more appropriate, and resource utilization is improved.

Figure 2:
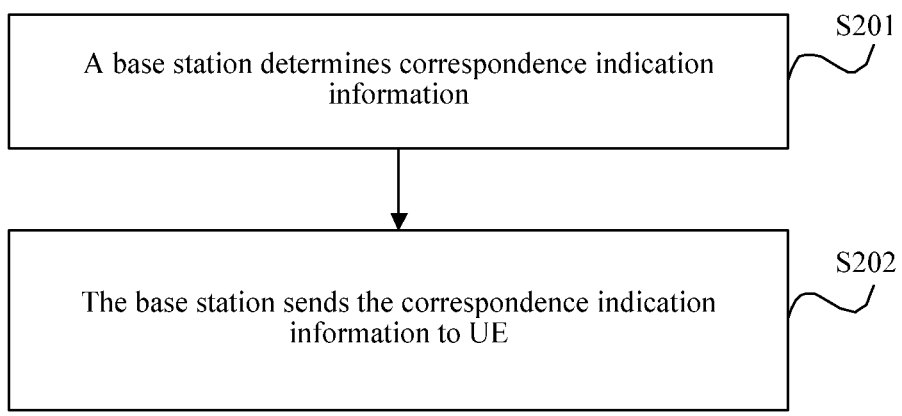
FIG. 2 is a schematic flowchart of Embodiment 2 of a PUCCH configuration method according to the present embodiments.

FIG. 2 is a schematic flowchart of Embodiment 2 of a PUCCH configuration method according to the present embodiments. The method in this embodiment is executed by a base station, and the method in this embodiment is as follows.

S201: The base station determines correspondence indication information.

The correspondence indication information is used to indicate a currently-used correspondence of UE, and the correspondence includes information about a first cell and a second cell corresponding to the first cell. The first cell is a cell for which a physical uplink control channel (PUCCH) is already configured, and uplink feedback information of the second cell is borne by using the PUCCH of the first cell corresponding to the second cell.

The correspondence indication information includes information about a currently-used first cell and a second cell corresponding to the currently-used first cell; or before the sending, by the base station, the correspondence indication information to the UE, the method further includes: sending, by the base station, a first correspondence to the UE, where the first correspondence includes the information about the first cell and the second cell corresponding to the first cell; and the correspondence indication information includes indication information of activating the first correspondence; or before the sending, by the base station, the correspondence indication information to the UE, the method further includes: sending, by the base station, a first correspondence and a second correspondence to the UE, where the first correspondence and the second correspondence include the information about the first cell and the second cell corresponding to the first cell; and the correspondence indication information includes indication information of activating the first correspondence or the second correspondence.

More specifically, the first correspondence further includes a first serial number, and the second correspondence further includes a second serial number; and the indication information of activating the first correspondence or the second correspondence is serial number information of an activated correspondence; or the correspondence indication information includes information about at least one deactivated first cell.

For a detailed description of the correspondence indication information, refer to S101 in the embodiment shown in FIG. 1. Details are not described herein again.

S202: The base station sends the correspondence indication information to UE.

In this embodiment, a base station determines correspondence indication information, where the correspondence indication information is used to indicate a currently-used correspondence of UE, and the correspondence includes information about a first cell and a second cell corresponding to the first cell. The first cell is a cell for which a PUCCH is already configured, and uplink feedback information of the second cell is borne by using the PUCCH of the first cell corresponding to the second cell, so that the UE determines, according to the indication information indicating the used correspondence, a PUCCH used to send the uplink feedback information of the second cell. By setting a correspondence between a first cell and a second cell, PUCCHs can be configured for multiple cells of UE, and the PUCCHs of the multiple cells jointly bear uplink feedback information, to reduce load of the cells for which the PUCCHs are configured.

Figure 3:
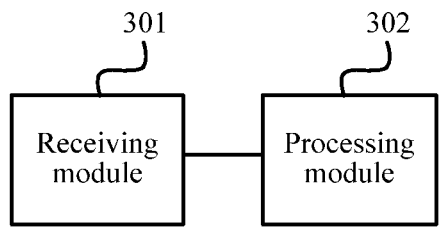
FIG. 3 is a schematic structural diagram of Embodiment 1 of a PUCCH configuration apparatus according to the present embodiments.

FIG. 3 is a schematic structural diagram of Embodiment 1 of a PUCCH configuration apparatus according to the present embodiments. The PUCCH configuration apparatus in this embodiment may be deployed in a user equipment (UE). The apparatus in this embodiment includes a receiving module 301 and a processing module 302. The receiving module 301 is configured to receive correspondence indication information sent by a base station, where the correspondence indication information is used to indicate a currently-used correspondence, and the correspondence includes information about a first cell and a second cell corresponding to the first cell. The first cell is a cell for which a PUCCH is already configured, and uplink feedback information of the second cell is borne by using the PUCCH of the first cell corresponding to the second cell. The processing module 302 is configured to determine, according to the currently-used correspondence, a PUCCH used to send the uplink feedback information of the second cell.

In the foregoing embodiment, the correspondence indication information includes information about a currently-used first cell and a second cell corresponding to the currently-used first cell.

In the foregoing embodiment, the receiving module 301 is further configured to receive a first correspondence sent by the base station, where the first correspondence includes the information about the first cell and the second cell corresponding to the first cell; and the correspondence indication information includes indication information of activating the first correspondence.

In the foregoing embodiment, the receiving module 301 is further configured to receive a first correspondence and a second correspondence that are sent by the base station, where the first correspondence and the second correspondence include the information about the first cell and the second cell corresponding to the first cell, where the correspondence indication information includes indication information of activating the first correspondence or the second correspondence.

In the foregoing embodiment, the first correspondence further includes a first serial number, and the second correspondence further includes a second serial number; the indication information of activating the first correspondence or the second correspondence is serial number information of an activated correspondence; and the processing module 302 is further configured to activate a correspondence corresponding to the serial number information of the activated correspondence.

In the foregoing embodiment, the correspondence indication information includes information about at least one deactivated first cell; and the processing module 302 is further configured to: deactivate a PUCCH of the at least one deactivated first cell, and establish a correspondence between a second cell corresponding to the deactivated first cell and a first cell in an active state.

In the foregoing embodiment, the correspondence indication information includes information about at least one activated first cell; and the processing module 302 is further configured to: activate a PUCCH of the at least one activated first cell, and establish a correspondence between the activated first cell and a second cell.

In the foregoing embodiment, the receiving module 301 is specifically configured to: receive, at an L1 moment, the correspondence indication information by using a media access control layer control element (MAC CE) or a physical downlink control channel (PDCCH), and use, at an L1+S moment, the correspondence indicated by the correspondence indication information, where S is a positive number; or receive, at an L1 moment, the correspondence indication information by using radio resource control RRC signaling, and use, at an L1+S moment, the correspondence indicated by the correspondence indication information.

In the foregoing embodiment, the receiving module 301 is further configured to receive deactivation indication sent by the base station, and the processing module is further configured to: deactivate at least one first cell according to the deactivation indication, and deactivate all second cells that have a correspondence to the first cell.

In the foregoing embodiment, the second cell corresponding to the first cell belongs to at least two timing advance groups: a first secondary timing advance group and a second timing advance group, and the processing module 302 is further configured to: when an uplink time alignment timer corresponding to the first secondary timing advance group that includes the first cell expires, release, by the processing module 302, a sounding reference signal (SRS) resource corresponding to a cell in the first secondary timing advance group, and perform, by the processing module, at least one of the following processing: releasing, by the processing module 302, a CQI resource configured for the second cell corresponding to the first cell. The second cell includes a second cell that belongs to the second timing advance group and a second cell that belongs to the first secondary timing advance group; releasing, by the processing module 302, an SRS resource configured for a second cell that corresponds to the first cell and that belongs to the second timing advance group and/or clearing uplink authorization, downlink authorization, and/or HARQ buffer information that correspond/corresponds to the second cell; deactivating, by the processing module 302, the second cell that corresponds to the first cell and that belongs to the second timing advance group; stopping, by the processing module 302, uplink transmission configured for the second cell that corresponds to the first cell and that belongs to the second timing advance group; or stopping, by the processing module 302, an uplink time alignment timer of the second timing advance group, where all cells included in the second timing advance group are a second cell corresponding to a first cell included in the first secondary timing advance group.

In this embodiment, the receiving module receives correspondence indication information sent by a base station, where the correspondence indication information is used to indicate a currently-used correspondence, and the processing module determines, according to the currently-used correspondence, a PUCCH used to send uplink feedback information of a second cell. By setting a correspondence between a first cell and a second cell, PUCCHs can be configured for multiple cells of UE, and the PUCCHs of the multiple cells jointly bear uplink feedback information, to reduce load of the cells for which the PUCCHs are configured. In addition, a used correspondence can be adjusted by using correspondence indication information such as activation or deactivation, thereby quickly and dynamically adjusting the used correspondence.

Figure 4:
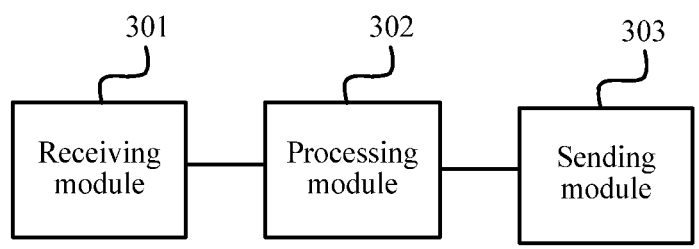
FIG. 4 is a schematic structural diagram of Embodiment 2 of a PUCCH configuration apparatus according to the present embodiments.

FIG. 4 is a schematic structural diagram of Embodiment 2 of a PUCCH configuration apparatus according to the present embodiments. Based on the embodiment shown in FIG. 3, the apparatus shown in FIG. 4 further includes a sending module 303, where the sending module 303 is configured to: determine that a trigger condition is satisfied, and report PH, where the trigger condition includes: a ratio between power headroom of any two first cells among power headroom of N first cells of the UE is greater than or equal to a first preset threshold, where N is an integer greater than or equal to 2; or power headroom of the UE is less than a second preset threshold, where the power headroom of the UE is obtained according to maximum transmit power of the UE, PUCCH power of a primary cell, PUCCH power of a secondary cell, physical uplink shared channel (PUSCH) power of the primary cell, and/or PUSCH power of the secondary cell; or the first cell of the UE is changed.

In the foregoing embodiment, that the first cell of the UE is changed includes: at least one first cell of the UE is activated; or a PUCCH of at least one first cell of the UE is activated; or at least one first cell of the UE is deactivated; or a PUCCH of at least one first cell of the UE is deactivated; or a PUCCH is configured for at least one cell of the UE; or a PUCCH is de-configured for at least one first cell of the UE; or it is configured that at least one cell including a PUCCH is added for the UE.

In the foregoing embodiment, the PH includes at least one of the following information: power headroom for the UE to perform transmission by using a PUCCH of the primary cell; power headroom for the UE to perform transmission by using a PUCCH of the secondary cell; or power headroom for the UE to perform transmission by using both the PUCCH of the primary cell and the PUCCH of the secondary cell.

In this embodiment, the sending module determines that a trigger condition is satisfied, and reports PH. A base station learns, according to the PH reported by UE, a load status of a cell for which a PUCCH is configured, and adjusts PUCCH configuration according to the PH. In this way, the PUCCH configuration is more appropriate, and resource utilization is improved.

Figure 5:
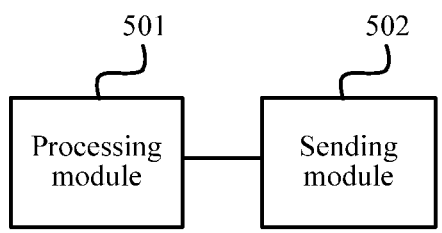
FIG. 5 is a schematic structural diagram of Embodiment 3 of a PUCCH configuration apparatus according to the present embodiments.

FIG. 5 is a schematic structural diagram of Embodiment 3 of a PUCCH configuration apparatus according to the present embodiments. The PUCCH configuration apparatus in this embodiment is deployed in a base station. The apparatus in this embodiment includes a processing module 501 and a sending module 502. The processing module 501 is configured to determine correspondence indication information, where the correspondence indication information is used to indicate a currently-used correspondence of UE, and the correspondence includes information about a first cell and a second cell corresponding to the first cell. The first cell is a cell for which a PUCCH is already configured, and uplink feedback information of the second cell is borne by using the PUCCH of the first cell corresponding to the second cell. The sending module 502 is configured to send the correspondence indication information to the UE.

In the foregoing embodiment, the correspondence indication information includes information about a currently-used first cell and a second cell corresponding to the currently-used first cell.

In the foregoing embodiment, the sending module 502 is further configured to send a first correspondence to the UE, where the first correspondence includes the information about the first cell and the second cell corresponding to the first cell; and the correspondence indication information includes indication information of activating the first correspondence.

In the foregoing embodiment, the sending module 502 is further configured to send a first correspondence and a second correspondence to the UE, where the first correspondence and the second correspondence include the information about the first cell and the second cell corresponding to the first cell; and the correspondence indication information includes indication information of activating the first correspondence or the second correspondence.

In the foregoing embodiment, the first correspondence further includes a first serial number, and the second correspondence further includes a second serial number; and the indication information of activating the first correspondence or the second correspondence is serial number information of an activated correspondence.

In the foregoing embodiment, the correspondence indication information includes information about at least one deactivated first cell.

In the foregoing embodiment, the correspondence indication information includes information about at least one activated first cell.

In the foregoing embodiment, the sending module is further configured to send a deactivation indication to the UE, so that the UE deactivates at least one first cell according to the deactivation indication, and deactivates all second cells that have a correspondence to the first cell.

By means of the apparatus in this embodiment, the processing module determines correspondence indication information, and the sending module sends the correspondence indication information to UE, where the correspondence indication information is used to indicate a currently-used correspondence of the UE, and the correspondence includes information about a first cell and a second cell corresponding to the first cell. The first cell is a cell for which a PUCCH is already configured, and uplink feedback information of the second cell is borne by using the PUCCH of the first cell corresponding to the second cell, so that the UE determines, according to the indication information indicating the used correspondence, a PUCCH used to send the uplink feedback information of the second cell. By setting a correspondence between a first cell and a second cell, PUCCHs can be configured for multiple cells of UE, and the PUCCHs of the multiple cells jointly bear uplink feedback information, to reduce load of the cells for which the PUCCHs are configured.

Figure 6:
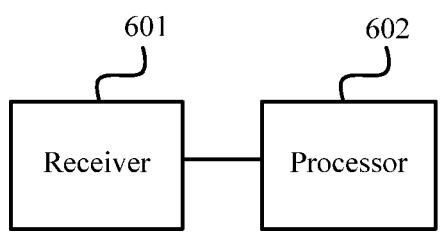
FIG. 6 is a schematic structural diagram of Embodiment 4 of a PUCCH configuration apparatus according to the present embodiments.

FIG. 6 is a schematic structural diagram of Embodiment 4 of a PUCCH configuration apparatus according to the present embodiments. The PUCCH configuration apparatus is deployed in a UE. The apparatus in this embodiment includes a receiver 601 and a processor 602. The receiver 601 is configured to receive correspondence indication information sent by a base station, where the correspondence indication information is used to indicate a currently-used correspondence, and the correspondence includes information about a first cell and a second cell corresponding to the first cell. The first cell is a cell for which a PUCCH is already configured, and uplink feedback information of the second cell is borne by using the PUCCH of the first cell corresponding to the second cell. The processor 602 is configured to determine, according to the currently-used correspondence, a PUCCH used to send the uplink feedback information of the second cell.

In the foregoing embodiment, the correspondence indication information includes information about a currently-used first cell and a second cell corresponding to the currently-used first cell.

In the foregoing embodiment, the receiver 601 is further configured to receive a first correspondence sent by the base station, where the first correspondence includes the information about the first cell and the second cell corresponding to the first cell; and the correspondence indication information includes indication information of activating the first correspondence.

In the foregoing embodiment, the receiver 601 is further configured to receive a first correspondence and a second correspondence that are sent by the base station, where the first correspondence and the second correspondence include the information about the first cell and the second cell corresponding to the first cell, where the correspondence indication information includes indication information of activating the first correspondence or the second correspondence.

In the foregoing embodiment, the first correspondence further includes a first serial number, and the second correspondence further includes a second serial number; the indication information of activating the first correspondence or the second correspondence is serial number information of an activated correspondence; and the processor 602 is further configured to activate a correspondence corresponding to the serial number information of the activated correspondence.

In the foregoing embodiment, the correspondence indication information includes information about at least one deactivated first cell; and the processor 602 is further configured to: deactivate a PUCCH of the at least one deactivated first cell, and establish a correspondence between a second cell corresponding to the deactivated first cell and a first cell in an active state.

In the foregoing embodiment, the correspondence indication information includes information about at least one activated first cell; and the processor 602 is further configured to: activate a PUCCH of the at least one activated first cell, and establish a correspondence between the activated first cell and a second cell.

In the foregoing embodiment, the receiver 601 is specifically configured to: receive, at an L1 moment, the correspondence indication information by using a media access control layer control element (MAC CE) or a PDCCH, and use, at an L1+S moment, the correspondence indicated by the correspondence indication information, where S is a positive number; or receive, at an L1 moment, the correspondence indication information by using radio resource control RRC signaling, and use, at an L1+S moment, the correspondence indicated by the correspondence indication information.

In the foregoing embodiment, the receiver 601 is further configured to receive deactivation indication sent by the base station, and the processor 602 is further configured to: deactivate at least one first cell according to the deactivation indication, and deactivate all second cells that have a correspondence to the first cell.

In the foregoing embodiment, the second cell corresponding to the first cell belongs to at least two timing advance groups: a first secondary timing advance group and a second timing advance group, and the processor 602 is further configured to: when an uplink time alignment timer corresponding to the first secondary timing advance group that includes the first cell expires, release, by the processor, an SRS resource corresponding to a cell in the first secondary timing advance group, and perform, by the processor, at least one of the following processing: releasing, by the processor 602, a CQI resource configured for the second cell corresponding to the first cell, where the second cell includes a second cell that belongs to the second timing advance group and a second cell that belongs to the first secondary timing advance group; releasing, by the processor 602, an SRS resource configured for a second cell that corresponds to the first cell and that belongs to the second timing advance group and/or clearing uplink authorization, downlink authorization, and/or HARQ buffer information that correspond/ corresponds to the second cell; deactivating, by the processor 602, the second cell that corresponds to the first cell and that belongs to the second timing advance group; stopping, by the processor 602, uplink transmission configured for the second cell that corresponds to the first cell and that belongs to the second timing advance group; or stopping, by the processor 602, an uplink time alignment timer of the second timing advance group, where all cells included in the second timing advance group are a second cell corresponding to a first cell included in the first secondary timing advance group.

In this embodiment, the receiver receives correspondence indication information sent by a base station, where the correspondence indication information is used to indicate a currently-used correspondence, and the processor determines, according to the currently-used correspondence, a PUCCH used to send uplink feedback information of a second cell. By setting a correspondence between a first cell and a second cell, PUCCHs can be configured for multiple cells of UE, and the PUCCHs of the multiple cells jointly bear uplink feedback information, to reduce load of the cells for which the PUCCHs are configured. In addition, a used correspondence can be adjusted by using correspondence indication information such as activation or deactivation, thereby quickly and dynamically adjusting the used correspondence.

Figure 7:
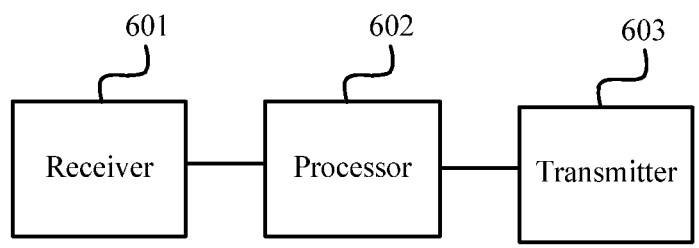
FIG. 7 is a schematic structural diagram of Embodiment 5 of a PUCCH configuration apparatus according to the present embodiments.

FIG. 7 is a schematic structural diagram of Embodiment 5 of a PUCCH configuration apparatus according to the present embodiments. Based on the embodiment shown in FIG. 6, the apparatus shown in FIG. 7 further includes a transmitter 603, where the transmitter 603 is configured to: determine that a trigger condition is satisfied, and report PH, where the trigger condition includes: a ratio between power headroom of any two first cells among power headroom of N first cells of the UE is greater than or equal to a first preset threshold, where N is an integer greater than or equal to 2; or power headroom of the UE is less than a second preset threshold, where the power headroom of the UE is obtained according to maximum transmit power of the UE, PUCCH power of a primary cell, PUCCH power of a secondary cell, PUSCH power of the primary cell, and/or PUSCH power of the secondary cell; or the first cell of the UE is changed.

In the foregoing embodiment, that the first cell of the UE is changed includes: at least one first cell of the UE is activated; or a PUCCH of at least one first cell of the UE is activated; or at least one first cell of the UE is deactivated; or a PUCCH of at least one first cell of the UE is deactivated; or a PUCCH is configured for at least one cell of the UE; or a PUCCH is de-configured for at least one first cell of the UE; or it is configured that at least one cell including a PUCCH is added for the UE.

In the foregoing embodiment, the PH includes at least one of the following information: power headroom for the UE to perform transmission by using a PUCCH of the primary cell; power headroom for the UE to perform transmission by using a PUCCH of the secondary cell; or power headroom for the UE to perform transmission by using both the PUCCH of the primary cell and the PUCCH of the secondary cell.

In this embodiment, the transmitter determines that a trigger condition is satisfied, and reports PH. A base station learns, according to the PH reported by UE, a load status of a cell for which a PUCCH is configured, and adjusts PUCCH configuration according to the PH. In this way, the PUCCH configuration is more appropriate, and resource utilization is improved.

Figure 8:
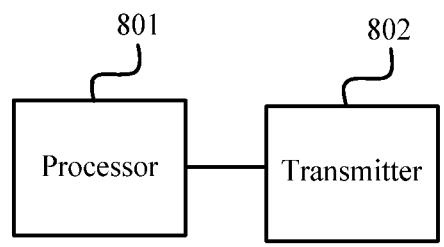
FIG. 8 is a schematic structural diagram of Embodiment 6 of a PUCCH configuration apparatus according to the present embodiments.

FIG. 8 is a schematic structural diagram of Embodiment 6 of a PUCCH configuration apparatus according to the present embodiments. The PUCCH configuration apparatus in this embodiment is deployed in a base station. The apparatus in this embodiment includes a processor 801 and a transmitter 802. The processor 801 is configured to determine correspondence indication information, where the correspondence indication information is used to indicate a currently-used correspondence of UE, and the correspondence includes information about a first cell and a second cell corresponding to the first cell. The first cell is a cell for which a PUCCH is already configured, and uplink feedback information of the second cell is borne by using the PUCCH of the first cell corresponding to the second cell. The transmitter 802 is configured to send the correspondence indication information to the UE.

In the foregoing embodiment, the correspondence indication information includes information about a currently-used first cell and a second cell corresponding to the currently-used first cell.

In the foregoing embodiment, the transmitter 802 is further configured to send a first correspondence to the UE, where the first correspondence includes the information about the first cell and the second cell corresponding to the first cell; and the correspondence indication information includes indication information of activating the first correspondence.

In the foregoing embodiment, the transmitter 802 is further configured to send a first correspondence and a second correspondence to the UE, where the first correspondence and the second correspondence include the information about the first cell and the second cell corresponding to the first cell; and the correspondence indication information includes indication information of activating the first correspondence or the second correspondence.

In the foregoing embodiment, the first correspondence further includes a first serial number, and the second correspondence further includes a second serial number; and the indication information of activating the first correspondence or the second correspondence is serial number information of an activated correspondence.

In the foregoing embodiment, the correspondence indication information includes information about at least one deactivated first cell.

In the foregoing embodiment, the correspondence indication information includes information about at least one activated first cell.

In the foregoing embodiment, the transmitter 802 is further configured to send a deactivation indication to the UE, so that the UE deactivates at least one first cell according to the deactivation indication, and deactivates all second cells that have a correspondence to the first cell.

In this embodiment, the processor determines correspondence indication information, and the transmitter sends the correspondence indication information to UE, where the correspondence indication information is used to indicate a currently-used correspondence of the UE, and the correspondence includes information about a first cell and a second cell corresponding to the first cell. The first cell is a cell for which a PUCCH is already configured, and uplink feedback information of the second cell is borne by using the PUCCH of the first cell corresponding to the second cell, so that the UE determines, according to the indication information indicating the used correspondence, a PUCCH used to send the uplink feedback information of the second cell. By setting a correspondence between a first cell and a second cell, PUCCHs can be configured for multiple cells of UE, and the PUCCHs of the multiple cells jointly bear uplink feedback information, to reduce load of the cells for which the PUCCHs are configured.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present embodiments, but not for limiting the present embodiments. Although the present embodiments are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
    receiving, by a user equipment (UE), correspondence indication information sent by a base station, wherein the correspondence indication information indicates a currently-used correspondence, wherein the correspondence indication information comprises
        information about a first primary cell,
        information about a first secondary cell corresponding to the first primary cell, wherein the first primary cell is a cell for which a first physical uplink control channel (PUCCH) is already configured, and wherein uplink feedback information of the first secondary cell is carried by the first PUCCH and comprises channel status indication information or channel quality indication information,
        information about a second primary cell, and
        information about a second secondary cell, wherein the second primary cell is a cell for which a second PUCCH channel is already configured, and wherein uplink feedback information of the second secondary cell is carried by the second PUCCH and comprises channel status indication information or channel quality indication information; and
    determining, by the UE according to the currently-used correspondence, the first PUCCH used to send the uplink feedback information of the first secondary cell and the second PUCCH used to send the uplink feedback information of the second secondary cell.

2. The method according to claim 1, wherein the correspondence indication information comprises information about a currently-used cell and a cell corresponding to the currently-used cell.

3. The method according to claim 1, wherein the method further comprises:
    receiving, by the UE, a first correspondence sent by the base station and a second correspondence sent by the base station, before receiving the correspondence indication information sent by the base station, wherein the first correspondence and the second correspondence each comprise different information about the first primary cell, the first secondary cell, the second primary cell, and the second secondary cell, wherein the correspondence indication information comprises indication information of activating the first correspondence or the second correspondence.

4. The method according to claim 3, wherein the first correspondence further comprises a first serial number, and the second correspondence further comprises a second serial number, wherein the indication information of activating the first correspondence or the second correspondence is serial number information of an activated correspondence, and wherein the method further comprises:
activating, by the UE, a correspondence corresponding to the serial number information of the activated correspondence, before determining the first PUCCH and the second PUCCH used to send the uplink feedback information of the first secondary cell and the second secondary cell.

5. The method according to claim 1, wherein the correspondence indication information comprises information about at least one deactivated cell and wherein the method further comprises:
deactivating, by the UE, a PUCCH of the at least one deactivated cell, and establishing a correspondence between a cell corresponding to the at least one deactivated cell and a cell in an active state, before determining the first PUCCH and the second PUCCH used to send the uplink feedback information of the first secondary cell and the second secondary cell.

6. The method according to claim 1, wherein the first secondary cell corresponding to the first primary cell belongs to at least a first secondary timing advance group and a second timing advance group, and wherein the method further comprises:
releasing, by the UE, a sounding reference signal (SRS) resource corresponding to a cell in the first secondary timing advance group, in response to an uplink time alignment timer corresponding to the first secondary timing advance group that comprises the first primary cell expires; and
performing, by the UE, at least one of the following steps:
releasing, by the UE, a channel quality indicator (CQI) resource configured for the first secondary cell corresponding to the first primary cell, wherein the first secondary cell comprises a cell that belongs to the second timing advance group and a cell that belongs to the first secondary timing advance group;
releasing, by the UE, an SRS resource configured for a cell that corresponds to the first primary cell and that belongs to the second timing advance group, or clearing uplink authorization, downlink authorization, or a hybrid automatic repeat request (HARQ) buffer information corresponding to the first secondary cell;
deactivating, by the UE, the first secondary cell that corresponds to the first Primary cell and that belongs to the second timing advance group;
stopping, by the UE, uplink transmission configured for the first secondary cell that corresponds to the first primary cell and that belongs to the second timing advance group; or
stopping, by the UE, an uplink time alignment timer of the second timing advance group, wherein cells in the second timing advance group are cells corresponding to a cell comprised in the first secondary timing advance group.

7. The method according to claim 1, further comprising:
determining, by the UE, that a trigger condition is satisfied; and
reporting power headroom (PH), wherein the trigger condition comprises:
a ratio between power headroom of any two cells among power headroom of N cells of the UE being greater than or equal to a first preset threshold, wherein N is an integer greater than or equal to 2;
power headroom of the UE being less than a second preset threshold, wherein the power headroom of the UE is obtained according to maximum transmit power of the UE, PUCCH power of a primary cell, PUCCH power of a secondary cell, physical uplink shared channel (PUSCH) power of the primary cell, or PUSCH power of the secondary cell; or
a primary cell of the UE being changed.

8. A method, comprising:
determining, by a base station, correspondence indication information, wherein the correspondence indication information indicates a currently-used correspondence of a user equipment (UE), wherein the correspondence indication information comprises
information about a first primary cell,
information about a first secondary cell corresponding to the first primary cell, wherein the first primary cell is a cell for which a first physical uplink control channel (PUCCH) is already configured, and wherein uplink feedback information of the first secondary cell is carried by the first PUCCH and comprises channel status indication information or channel quality indication information,
information about a second primary cell, and
information about a second secondary cell, wherein the second primary cell is a cell for which a second PUCCH channel is already configured, and wherein uplink feedback information of the second secondary cell is carried by the second PUCCH and comprises channel status indication information or channel quality indication information; and
sending, by the base station to the UE, the correspondence indication information.

9. The method according to claim 8, wherein the correspondence indication information comprises information about a currently-used cell and information about a cell corresponding to the currently-used cell.

10. The method according to claim 8, wherein the method further comprises:
sending, by the base station, a first correspondence and a second correspondence to the UE, before sending the correspondence indication information, wherein the first correspondence and the second correspondence each comprise different information about the first primary cell, the first secondary cell, the second primary cell, and the second secondary cell, wherein the correspondence indication information comprises indication information of activating the first correspondence or the second correspondence.

11. A user equipment (UE), comprising:
a processor; and
a non-transitory computer readable storage medium storing a program for execution by the processor, the program including instructions to:
receive correspondence indication information sent by a base station, wherein the correspondence indication information indicates a currently-used correspondence, and the correspondence indication information comprises
information about a first primary cell, information about a first secondary cell corresponding to the first primary cell, wherein the first primary cell is a cell for which a first physical uplink control channel (PUCCH) is already configured, and wherein uplink feedback information of the first secondary cell is carried by the first PUCCH and comprises channel status indication information or channel quality indication information, information about a second primary cell, and information about a second secondary cell, wherein the second primary cell is a cell for which a second PUCCH channel is already configured, and wherein uplink feedback information of the second secondary cell is carried by the second PUCCH and comprises channel status indication information or channel quality indication information; and determine, according to the currently-used correspondence, the first PUCCH used to send the uplink feedback information of the first secondary cell and the second PUCCH used to send the uplink feedback information of the second secondary cell.

12. The UE according to claim 11, wherein the correspondence indication information comprises information about a currently-used cell and information about a cell corresponding to the currently-used cell.

13. The UE according to claim 11, wherein the instructions further comprise instructions to receive a first correspondence sent by the base station and a second correspondence sent by the base station, wherein the first correspondence and the second correspondence each comprise different information about the first primary cell, the first secondary cell, the second primary cell, and the second secondary cell, wherein the correspondence indication information comprises indication information of activating the first correspondence or the second correspondence.

14. The UE according to claim 13, wherein the first correspondence further comprises a first serial number, and the second correspondence further comprises a second serial number, wherein the indication information of activating the first correspondence or the second correspondence is serial number information of an activated correspondence, and wherein the instructions further comprise instructions to:
activate a correspondence corresponding to the serial number information of the activated correspondence.

15. The UE according to claim 11, wherein the correspondence indication information comprises information about at least one deactivated cell, and wherein the instructions further comprise instructions to:
deactivate a PUCCH of the at least one deactivated cell; and
establish a correspondence between a cell corresponding to the at least one deactivated cell and a cell in an active state.

16. The UE according to claim 11, wherein the first secondary cell corresponding to the first primary cell belongs to at least a first secondary timing advance group and a second timing advance group, and wherein the instructions further comprise instructions to:
release a sounding reference signal (SRS) resource corresponding to a cell in the first secondary timing advance group, in response to expiration of an uplink time alignment timer corresponding to the first secondary timing advance group that comprises the first primary cell; and
perform at least one of the following steps:
releasing a channel quality indicator (CQI) resource configured for the first secondary cell corresponding to the first primary cell, wherein the first secondary cell comprises a cell that belongs to the second timing advance group and a cell that belongs to the first secondary timing advance group;
releasing an SRS resource configured for a cell that corresponds to the first primary cell and that belongs to the second timing advance group, or clearing uplink authorization, downlink authorization, or hybrid automatic repeat request (HARQ) buffer information corresponding to the first secondary cell;
deactivating the first secondary cell that corresponds to the first primary cell and that belongs to the second timing advance group;
stopping uplink transmission configured for the first secondary cell that corresponds to the first primary cell and that belongs to the second timing advance group; or
stopping an uplink time alignment timer of the second timing advance group, wherein cells in the second timing advance group are cells corresponding to a cell in the first secondary timing advance group.

17. The UE according to claim 11, wherein the instructions further comprise instructions to:
determine that a trigger condition is satisfied; and
report power headroom (PH), wherein the trigger condition comprises:
a ratio between power headroom of any two cells among power headroom of N cells of the UE being greater than or equal to a first preset threshold, wherein N is an integer greater than or equal to 2;
power headroom of the UE being less than a second preset threshold, wherein the power headroom of the UE is obtained according to maximum transmit power of the UE, PUCCH power of a primary cell, PUCCH power of a secondary cell, physical uplink shared channel (PUSCH) power of the primary cell, or PUSCH power of the secondary cell; or
a primary cell of the UE being changed.

18. A base station, and comprising:
a processor; and
a non-transitory computer readable storage medium storing a program for execution by the processor, the program including instructions to:
determine correspondence indication information, wherein the correspondence indication information indicates a currently-used correspondence of a user equipment (UE), wherein the correspondence indication information comprises
information about a first primary cell,
information about a first secondary cell corresponding to the first primary cell, wherein the first primary cell is a cell for which a first physical uplink control channel (PUCCH) is already configured, and wherein uplink feedback information of the first secondary cell is carried by the first PUCCH and comprises channel status indication information or channel quality indication information,
information about a second primary cell, and
information about a second secondary cell, wherein the second primary cell is a cell for which a second PUCCH channel is already configured, and wherein uplink feedback information of the second secondary cell is carried by the second PUCCH and comprises channel status indication information or channel quality indication information; and
send the correspondence indication information to the UE.

19. The base station according to claim 18, wherein the correspondence indication information comprises information about a currently-used first cell and information about a second cell corresponding to the currently-used first cell.

20. The base station according to claim 18, wherein the instructions further comprise instructions to:
send a first correspondence to the UE and send a second correspondence to the UE, wherein the first correspondence and the second correspondence each comprise different information about the first primary cell, the first secondary cell, the second primary cell, and the second secondary cell, wherein the correspondence indication information comprises indication information of activating the first correspondence or the second correspondence.

* * * * *